Sept. 23, 1958 J. G. WOODS 2,853,662

RECTIFIER CONSTRUCTION

Filed June 22, 1956

INVENTOR.
JOHN G. WOODS

BY Donald S. Cohen

ATTORNEY 2,853,662

RECTIFIER CONSTRUCTION

John G. Woods, Philadelphia, Pa., assignor to International Resistance Company, Philadelphia, Pa.

Application June 22, 1956, Serial No. 593,245
11 Claims. (Cl. 317—234)

This invention relates to the construction of a rectifier assembly. More particularly it relates to a miniature dual dry plate type diode assembly for use on a printed circuit panel to replace a vacuum tube rectifier.

The present trend in the manufacture of electronic equipment such as radio and television sets is toward automatic assembly of the various electrical components making up the circuit on a printed circuit panel. For this purpose these components must be small, rigid and capable of being handled by machines without being damaged. Many of the well known components, such as resistors and capacitors, meet these qualifications. However, vacuum tubes, although made in very small sizes, require special mounting sockets and are too fragile to be handled automatically. Although it is known to replace certain vacuum tubes by dry plate type diode assemblies, such assemblies not only have to be small and rigid but must also be simple in construction and easy to assemble so that they are relatively inexpensive to manufacture.

It is therefore an object of this invention to provide a dual dry plate type diode assembly for use on a printed circuit panel in place of a vacuum tube rectifier. Another object is to provide a rectifier assembly which is small, rigid and capable of being handled mechanically without damage. Still another object is to provide a miniature rectifier assembly which is simple in construction and easy to assemble. Other objects of the invention will in part be obvious and will in part appear hereinafter.

The invention accordingly comprises the features of construction, combinations of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which.

Figures 1, 2:
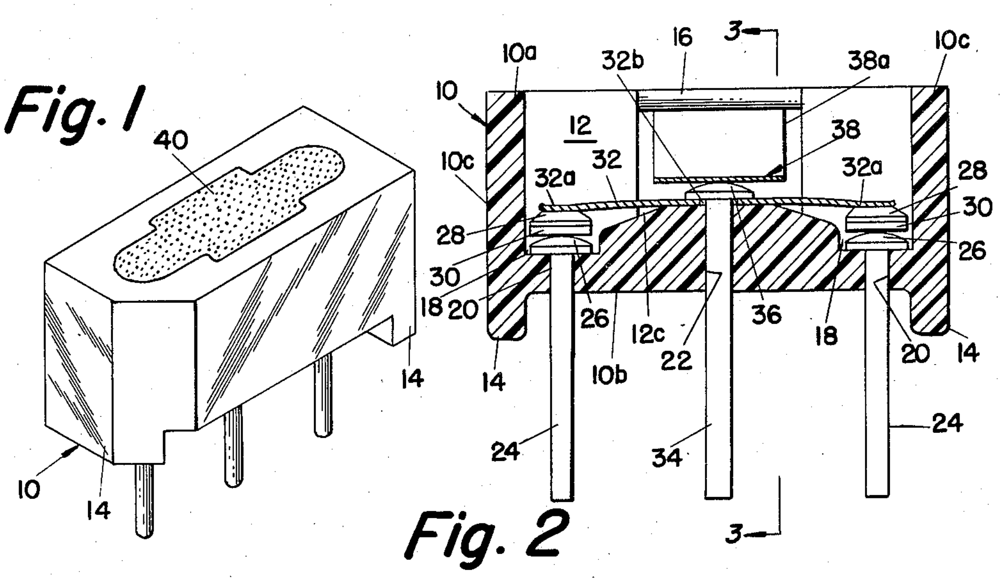
Figure 1 is a perspective view of the completed rectifier assembly.
Figure 2 is a vertical sectional view of the assembly.
Figure 3:
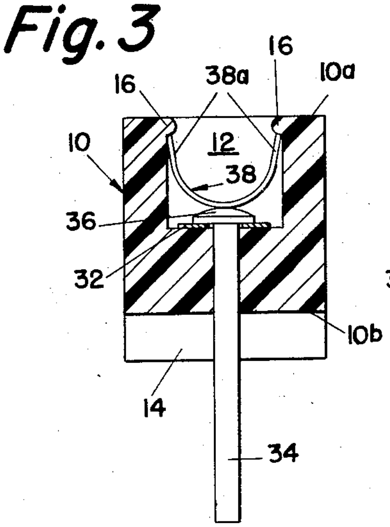
Figure 3 is a vertical view of the assembly taken along lines 3—3 of Figure 2.
Figure 4:
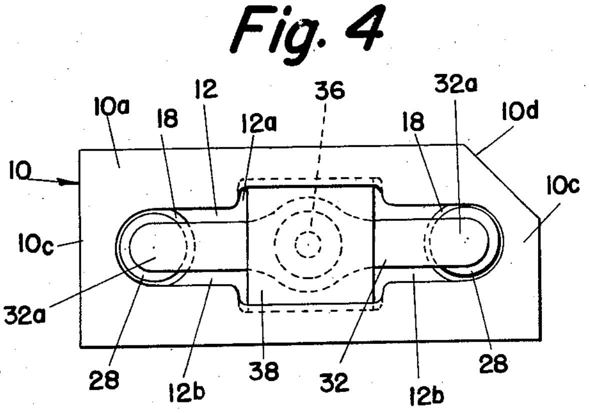
Figure 4 is a top plan view of the assembly shown in Figure 2.

Referring to the drawing, the assembly comprises a substantially rectangular rigid casing 10 of an electrical insulating material, such as a cured phenolic plastic or a porcelain type ceramic. The casing 10 has a cavity 12 in its top surface **10*a* and a pair of parallel legs 14—14 extending from its bottom surface 10*b* along each end wall 10*c*. The casing 10 may have one corner removed to provide a flat surface 10*d* for identification purposes as will be explained later. The cavity 12 has a central portion 12*a* which is wider than the end portions 12*b* thereof (Figure 4). The central portion 12*a* has a lip 16 (Figures 2 and 3) projecting inwardly from the top edge of each side thereof. The bottom surface 12*c* of the cavity 12 tapers downwardly from its central portion to the edge of a depression 18 at each end thereof. Each depression 18 has a central hole 20 extending from its bottom to the bottom surface 10*b* of the casing 10. A third hole 22 extends through the casing 10 from the central portion of the bottom 12*c* of the cavity 12**.

An end terminal lead wire 24 of a relatively stiff electrically conducting metal extends through each of the depression holes 20 and has an enlarged head 26 which sits on the bottom of the depression 18. A dry plate type rectifier cell 28 is positioned in each depression 18 over the heads 26 of the leads 24 with a metal spacer member 30 disposed therebetween. The cells 28 may be any well known dry plate type, which normally comprise a disk of a conducting metal at one electrode, a layer of a semi-conducting material such as selenium or cuprous oxide, coated on the electrode disk and a counter-electrode layer of a conducting metal over the semi-conducting layer. Although the cells 28 and spacers 30 are shown to be circular (Figure 4) they may be rectangular or any other desired configuration. The depressions 18 should be of a configuration similar to that of the cells 28 so as to receive and position them. A flat metal leaf spring 32 extends across the bottom of the cavity 12 with its ends **32*a* engaging the top electrode surface of the rectifier cells 28. Leaf spring 32 has a central hole 32*b* which is in alignment with the central hole 22 in the casing 10. A central terminal lead wire 34 extends through the aligned holes 32*b* and 22 in the spring 32 and casing 10 respectively and has an enlarged head 36 engaging the top surface of the spring 32. A U-shaped retainer clip 38 within the central portion 12*a* of the cavity 12 is seated on the central lead head 36 to hold the head and the spring 32 against the bottom surface 12*c* of the cavity. The legs 38*a* of the retainer clip 38 are of such a length that their ends just fit under the lips 16 to lock the clip 38 tightly in place. The ends 32*a* of the spring 32 are normally bent slightly downwardly. Thus, when the retainer clip 38 is inserted the spring 32 is flattened out so that its ends 32*a* apply uniform pressure onto the cells 28 to hold them tightly against the lead heads 26. The cavity 12 may then be filled with an insulating material 40 (Figure 1), such as a thermosetting or thermoplastic resin, a ceramic type cement, or a wax, to protect the cells 28** from moisture and dirt.

As shown in the drawing, the cells 28 are arranged so that their cathodes are connected in common to the central lead 34. However, they may be reversed so that their anodes are connected in common or only one may be reversed so that they are connected in series between the end leads 24. Also, one cell may be larger than the other cell or more than one cell may be stacked over one or both of the end leads 24. If the cells are connected in series or one side has more or larger cells than the other side, the flattened corner **10*d* on the casing 10** can be used to indicate the direction or arrangement of the cells.

To assemble this unit, the casing 10 is supported in a substantially horizontal position with the cavity 12 opening upwardly. End terminal leads 24 are first inserted through holes 20 and then spacers 30 and cells 28 are placed in depressions 18 over the lead heads 26. Since depressions 18 are substantially the same size and shape as cells 28, the cells will be positioned and held over the lead heads 26. Leaf spring 32 having central terminal lead 34 inserted through hole **32*b* therein is then placed in the cavity 12 with the lead 34 being inserted through central hole 22. This automatically positions leaf spring 32 with its ends 32*a* over the cells 28. Retainer clip 38 is then inserted in the cavity 12 and forced downwardly until its legs 38*a* engage under lips 16 to lock the assembly in the casing. Finally, the cavity may be filled with the insulating material 40**. By this arrangement each element holds the previously inserted elements in place until the retainer clip 38 finally locks the entire unit together. This simple sequential assembly method permits easy and quick assembly by hand without the need of any special jigs or tools and particularly permits automatic assembly of the unit.

Thus, there is provided a small compact dual diode assembly composed of a minimum number of parts so that it can be easily and quickly assembled. The unit has three aligned fairly rigid terminal leads which permit it to be easily inserted into a printed circuit panel. Since the assembly is enclosed in a rigid casing, the assembling of the unit onto a printed circuit panel can be done by machine without fear of damaging the unit. When assembled on a printed circuit panel, the legs 14 on the casing 10 space the unit from the panel to allow air to circulate therebetween. Thus, during the soldering of the leads to the printed circuit panel, the casing and leads are cooled sufficiently by the air to prevent damage to the cells by heat being conducted thereto.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A rectifier assembly comprising the combination of a casing of electrical insulating material having a cavity in one surface thereof, a pair of rectifier cells in the cavity in spaced apart relation, a pair of spaced apart terminal leads of conducting metal extending through the bottom surface of the cavity and electrically connected to one electrode of the cells, a leaf type electrical connector in the cavity extending between and contacting the other electrode of the cells, a third terminal lead extending through the bottom surface of the cavity between the cells and engaging the leaf spring, and retainer means engaging the side walls of the cavity and holding the spring against the cells.

2. A rectifier assembly comprising the combination of a casing of electrical insulating material having a cavity in one surface thereof, a pair of spaced apart terminal leads of a conducting metal extending through the bottom surface of the cavity and having enlarged heads seated on said bottom surface, a rectifier cell seated on each of said lead heads and having an electrode electrically connected thereto, a leaf spring of a conducting material in said cavity extending between and contacting the other electrode of said cells, a third terminal lead extending through said spring and bottom surface of the cavity between said cells and having an enlarged head seated on said spring, and a retainer means in said casing holding the head of said third terminal against said spring and holding the spring against the cells.

3. The combination as set forth in claim 2 in which the retainer member is U-shaped with its bottom portion seated on the head of said third terminal and its leg portions engaging the side walls of the cavity.

4. The combination as set forth in claim 3 including a lip extending from each side wall of the cavity over and engaging the ends of the legs of the retainer member.

5. A rectifier assembly comprising the combination of a casing of electrical insulating material having a cavity in one surface thereof, a pair of spaced depressions in the bottom surface of said cavity, a terminal of a conducting metal extending through the bottom of each depression and having an enlarged head seated therein, a rectifier cell in each depression seated on and having one electrode electrically connected to said lead head therein, a leaf spring in said cavity extending between and contacting the other electrode of each of the cells, a third terminal lead extending through aligned holes in said leaf spring and the bottom of said cavity between said cells and having an enlarged head seated on said leaf spring, and a retainer member seated on the head of said third terminal lead and holding the spring tightly against the cells.

6. The combination as set forth in claim 5 in which the third terminal lead is positioned midway between the cells and the bottom surface of the cavity tapers downwardly away from said third lead to the edge of each of said depressions.

7. The combination as set forth in claim 5 including an insulating material filling said cavity above the cells to protect said cells from dirt and moisture.

8. A rectifier assembly comprising the combination of a substantially rectangular casing of electrical insulating material having a cavity in one surface thereof, a pair of spaced depressions in the bottom surface of said cavity one at each end thereof, a terminal lead wire of a conductive metal extending through the bottom of each of the depressions and having an enlarged head seated thereon, a rectifier cell in each depression seated on and having one electrode electrically connected to said lead head therein, a flat leaf spring of a conducting material in said cavity extending between and contacting the other electrode of each of the cells, a third terminal lead extending through aligned holes in said leaf spring and the bottom surface of said cavity between the cells and having an enlarged head seated on said leaf spring, and a retainer member seated on the head of said third terminal lead and holding the spring tightly against the cells.

9. The combination as set forth in claim 8 in which the retainer member is U-shaped with its bottom portion seated on the head of the third terminal lead and its leg portions engaging the side walls of the cavity.

10. The combination as set forth in claim 9 including a lip extending from each side wall of the cavity over and engaging the ends of the legs of the retainer member.

11. The combination as set forth in claim 8 in which said third terminal lead is positioned midway between the cells and the bottom surface of the cavity tapers downwardly away from said third terminal lead to the edge of each of said depressions.

References Cited in the file of this patent

UNITED STATES PATENTS

| | | |
|---|---|---|
| 1,898,321 | Strobel | Feb. 21, 1933 |
| 2,639,393 | Birt et al. | May 19, 1953 |